(12) United States Patent
Lyakas et al.

(10) Patent No.: US 10,754,995 B2
(45) Date of Patent: Aug. 25, 2020

(54) CONSISTENCY ACROSS KEY VALUE STORES WITH SHARED JOURNALS

(71) Applicant: Zadara Storage, Inc., Irvine, CA (US)

(72) Inventors: Alex Lyakas, Haifa (IL); Shyam Kaushik V., Bangalore (IN)

(73) Assignee: Zadara Storage, Inc., Irvine, CA (US)

( * ) Notice: Subject to any disclaimer, the term of this patent is extended or adjusted under 35 U.S.C. 154(b) by 59 days.

(21) Appl. No.: 15/726,104

(22) Filed: Oct. 5, 2017

(65) Prior Publication Data
US 2019/0108365 A1 Apr. 11, 2019

(51) Int. Cl.
*G06F 21/80* (2013.01)
*G06F 16/23* (2019.01)
*H04L 9/08* (2006.01)

(52) U.S. Cl.
CPC ......... *G06F 21/80* (2013.01); *G06F 16/2365* (2019.01); *H04L 9/0822* (2013.01); *H04L 9/0894* (2013.01); *H04L 2209/24* (2013.01)

(58) Field of Classification Search
CPC ... G06F 21/80; G06F 16/2365; H04L 9/0894; H04L 9/0822; H04L 2209/24
See application file for complete search history.

(56) References Cited

U.S. PATENT DOCUMENTS

| 8,572,379 | B2 * | 10/2013 | Cancedda | G06F 21/602 |
| | | | | 713/168 |
| 9,742,863 | B2 * | 8/2017 | Guerin | G06F 15/17331 |
| 2012/0036317 | A1 * | 2/2012 | Torii | G06F 16/90339 |
| | | | | 711/108 |
| 2013/0036136 | A1 * | 2/2013 | Horii | G06F 9/466 |
| | | | | 707/770 |
| 2013/0218840 | A1 * | 8/2013 | Smith | G06F 11/1446 |
| | | | | 707/639 |
| 2014/0365527 | A1 * | 12/2014 | Fuchs | G06F 21/6227 |
| | | | | 707/786 |
| 2016/0321294 | A1 | 11/2016 | Wang et al. | |

OTHER PUBLICATIONS

PCT/US2018/052538, USPTO as ISA, "International Search Report and Written Opinion," 12 pages.

(Continued)

*Primary Examiner* — Cheng-Feng Huang

(57) ABSTRACT

A method is provided for a transaction manager in a database system to provide consistency across multiple persistent key-value (KV) stores, each having its own non-persistent transactions, for modifications to the persistent KV stores that must all persist or none at all. The method includes joining a first KV store's transaction and joining a second KV store's transaction. For a set of modifications including a first modification to the first KV store and a second modification to the second KV store that must all persist or none at all, the method includes inserting the first modification into the first KV store's transaction, inserting the second modification into the second KV store's transaction, and creating and writing a combined journal entry including first and second sub-entries describing the first and the second modifications in a persistent global journal, respectively.

12 Claims, 4 Drawing Sheets

(56) References Cited

OTHER PUBLICATIONS

Rothermel K et al: "Aries/NT: A Recovery Method Based on Write-Ahead Logging for Nested Transactions", Proceedings of the 17th International Conference on Verylarge Data Bases, Sep. 3-6, 1991, pp. 337-346.
Udai Shanker et al.: "Distributed real time database systems: background and literature review", Distributed and Parallel Databases, Apr. 1, 2008, pp. 127-149.
Woon-Hak Kang et al.: "Durable write cache in flash memory SSD for relational and NoSQL databases", Proceedings of the 2014 ACM SIGMOD International Conference on Management of Data, Sigmod '14, Jun. 18, 2014, pp. 529-540.

* cited by examiner

CONSISTENCY ACROSS KEY VALUE STORES WITH SHARED JOURNALS

FIELD OF INVENTION

This invention relates to key-value stores, and more particularly to journaling for key-value stores to withstand system crashes or storage failures.

DESCRIPTION OF RELATED ART

A key-value (KV) store can be viewed as a simple database. Unlike a structured query language (SQL) database, which arranges its data into tables and columns, a KV store is just a collection of key-value pairs. A key can be anything, e.g., an integer or a string. The only requirement is that the KV store knows how to compare any two keys. A value can also be anything, and the KV store treats it as a binary large object (BLOB). The only requirement is that KV store knows the size of a value so it can store it on disk.

Typically a KV store operates by transactions. A new transaction is opened when an application wants to perform some modification on the KV store, such as inserting a new key. Later, additional changes can be made on behalf of this transaction. At some point, the KV store decides that the current running transaction has accumulated enough changes. KV store then commits the current transaction so all modifications on behalf of it are persisted on disk. Now a new running transaction can be opened. Each transaction has some kind of transaction ID, such as a monotonically increasing integer.

From the application perspective, the typical flow is:
1. Join a KV store transaction.
2. Perform a set of modifications, e.g., insert new key-value pairs, delete key-value pairs, modify some keys, modify some values.
3. Detach the KV store transaction.

A transaction cannot commit while there are application threads still joined to it. Only once all application threads have detached from the transaction, it can start committing. Typically, an application thread is attached to a transaction for a very short time—only to perform the in-memory modifications to the KV store.

This model ensures that either the whole set of modifications will be persisted to disk or none. For example, if the system crashes before a transaction commits, none of the changes that this transaction has collected so far will be persisted. However, after detaching from the transaction, the application does not know when exactly the set of modifications will be persisted. Moreover, if there is a crash or storage failure, the set of modifications will be lost entirely.

For some applications it is inacceptable to occasionally lose a set of modifications. Such applications need to use journaling in order to withstand system crashes or storage failures. Typically, the journaling is implemented by a KV store itself so that any application can use it.

Assume that on step 1 above, the application joins a running transaction with ID=5. This means that previous transaction with ID=4 has successfully committed. Assume that on step 2, the application inserts a new key-value pair [K1,V1]. In response, a journal entry is created:

Insert [K1,V1], Trans ID=5

This journal entry is then written to disk. At this point, the application can detach from then transaction and be sure that the key insertion will not be lost.

Assume now that the system crashes before transaction 5 has a chance to commit. After the system restarts, it knows that the latest committed transaction has ID=4. Consequently the journal is scanned for journal entries carrying transaction IDs higher than 4. The above journal entry is, therefore, considered as relevant. Accordingly, the [K1,V1] pair is re-inserted into transaction 5 and thus is not lost. This process is called "replaying a journal".

Assume now that transaction 5 commits successfully. In this case, if the system crashes at any later point, the journal entry above will not be considered relevant. This is because the journal entry describes a modification on behalf of a transaction that has already committed.

SUMMARY

In one or more examples of the present disclosure, a storage system includes discreet KV stores each having its own transactions. In the storage system, a single input/output (IO) path flow can make modifications to one or more KV stores.

In order to have a consistent system state across different KV stores with respect to handling the IO path flow, a global journaling mechanism is provided to do the following:

Join transactions of distinct KV stores, which disallows the KV stores from committing in-memory modifications on persistent media (e.g., disk);

Insert modifications to all KV store transactions that were joined;

Allocate a combined journal entry;

For each KV store modification, add a journal "sub-entry" into the combined journal entry, where the journal sub-entry carries the transaction ID of the KV store on which changes are being applied;

The combined journal entry is written with a single atomic write to persistent media; and When the journal write completes, detach from the KV store transactions.

Note that KV stores do not have any journal by itself. Each KV store maintains modifications in memory and periodically commits them to persistent media, at which point corresponding journal sub-entries become invalid. A combined journal entry can be freed when all sub-entry modifications in the corresponding KV store transactions are committed. When the system crashes, the transaction ID of each sub-entry of journal is checked to see if it has been committed in a corresponding KV store.

DETAILED DESCRIPTION OF THE INVENTION

Figure 1:
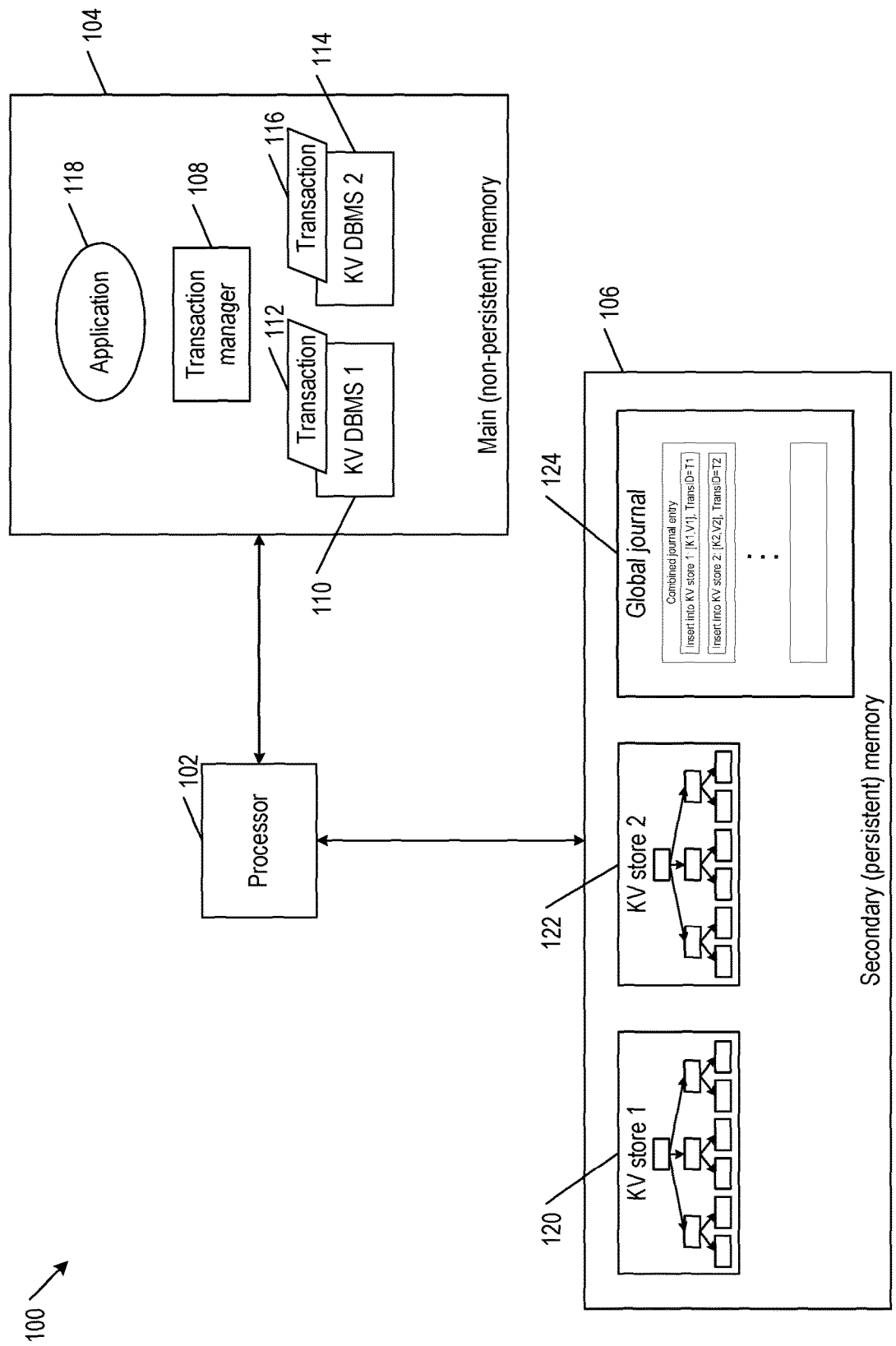
FIG. 1 is a storage system in some examples of the present disclosure.

In some cases, one application works against more than a single KV store. Assume that the application wants to insert a modification [K1,V1] into a KV store 1 and a modification [K2,V2] into a KV store 2. In addition, the application requires cross-KV-store consistency. In other words, either both modifications above are persisted or none of them.

A possible example flow for accomplishing this would be:
1. Join KV store 1's transaction.
2. Join KV store 2's transaction.
3. Insert modification [K1,V1] into KV store 1.
4. Insert modification [K2,V2] into KV store 2.
5. Detach KV store 1's transaction.
6. Detach KV store 2's transaction.

With such flow and with the model described above, cross-KV-store consistency is not possible. Each KV store has a separate journal. Two distinct journal entries will be created for the two modifications. One of the journal entries can be written to disk but the other journal entry might not make it to disk due to a crash. In that case, upon system restart, only one of the journal entries will be replayed. The result will be an inconsistent cross-KV-store state.

In examples of the present disclosure, a global journal is provided rather than a per-KV-store journal. The global journal contains combined journal entries, consisting of sub-entries, as will be shown below. The new application flow would be:
1. Join KV store 1's transaction (assume the transaction ID of this transaction is T1).
2. Join KV store 2's transaction (assume the transaction ID of this transaction is T2).
3. Insert modification [K1,V1] into KV store 1.
4. Insert modification [K2,V2] into KV store 2.
5. Create a combined journal entry that describes both changes:
    Insert into KV store 1: [K1,V1], Trans ID=T1;
    Insert into KV store 2: [K2,V2], Trans ID=T2.
6. Write the combined journal entry to persistent media (e.g., disk), and wait for the write to complete.
7. Detach KV store 1's transaction.
8. Detach KV store 2's transaction.

The combined journal entry is written as a single atomic write (e.g., one disk write operation). Therefore, both sub-entries are written together.

Detaching from both transactions only occurs after the combined journal entry has been persisted on disk. This ensures that none of the involved KV store transactions can commit until the combined journal entry is on disk. If detaching from any or both of the transactions occurs before writing the combined journal entry, the following example flow could have happened:

KV store 1 could commit its transaction before the combined journal entry is on disk.
Then system could crash before the combined journal entry is on disk.
After the system restarts, KV store 1 has its relevant modifications persisted, as part of the committed transaction T1. However, KV store 2 did not commit transaction T2. In addition, there is no combined journal entry on disk, which could have been used to re-apply the modifications in transaction T2.

The result is that the modifications in transaction T1 has been persisted, but the modifications in transaction T2 have been lost. Hence, the state of the system is now inconsistent.

Assume now that all eight steps above have been performed. Now the combined journal entry is on disk, and each KV store can commit its transaction at any time. Assume that the following example flow now happens:
9. KV store 1 commits transaction T1.
10. System crashes before KV store 2 could commit transaction T2.
11. Upon system restart, the combined journal entry written in step 6 in examined.
12. The first sub-entry is determined to be not relevant anymore because KV store 1 knows that transaction T1 has already committed so any sub-entries mentioning transaction T1 are not relevant anymore.
13. The second sub-entry is determined to be still relevant because KV store 2 knows that it has not committed transaction T2. KV store 2 knows that the last committed transaction was T2-1 (the transaction prior to transaction T2).
14. Only the second sub-entry is replayed, re-inserting modification [K2,V2] into transaction T2 of KV store 2 or directly committing modification [K2,V2] to KV store 2 on disk.
15. The system is back in the consistent state.

The above model is not limited to two KV stores. Consistency can be achieved over any number of KV stores, as long as the combined journal entry can be written in a single write operation.

FIG. 1 is a database system 100 in some examples of the present disclosure. System 100 includes a processor 102, a main (non-persistent) memory 104, and a secondary (persistent) memory 106.

Main memory 104 (e.g., random access memory) stores program instructions and data for a transaction manager 108, a first KV database management system (DBMS) 110 with its own transactions to manage a first KV store 120 (e.g., a current transaction 112 with a transaction ID=T1), a second KV DBMS 114 with its own transactions to manage a second KV store 122 (e.g., a current transaction 116 with a transaction ID=T2). Note that "KV DBMS" and "KV store" are used interchangeably and they are often considered together as one entity. Optionally main memory 104 stores program instructions and data for an application 118 that accesses first KV store 120 and second KV store 122. Alternatively application 118 may be located in another system connected by a network to storage system 100 to access first KV store 120 and second KV store 122.

Secondary memory 106 (e.g., disk) stores data that form first KV store 120, second KV store 122, and a global journal 124. Alternatively first KV store 120, second KV store 122, and global journal 124 may be located on different secondary memories. Processor 102, main memory 104, and secondary memory 106 may be a single server, or processor 102 and main memory 104 may be a server that accesses a secondary memory 106 that is a storage system, such as storage area network (SAN) or a network attached storage (NAS), over a network.

Figure 2:
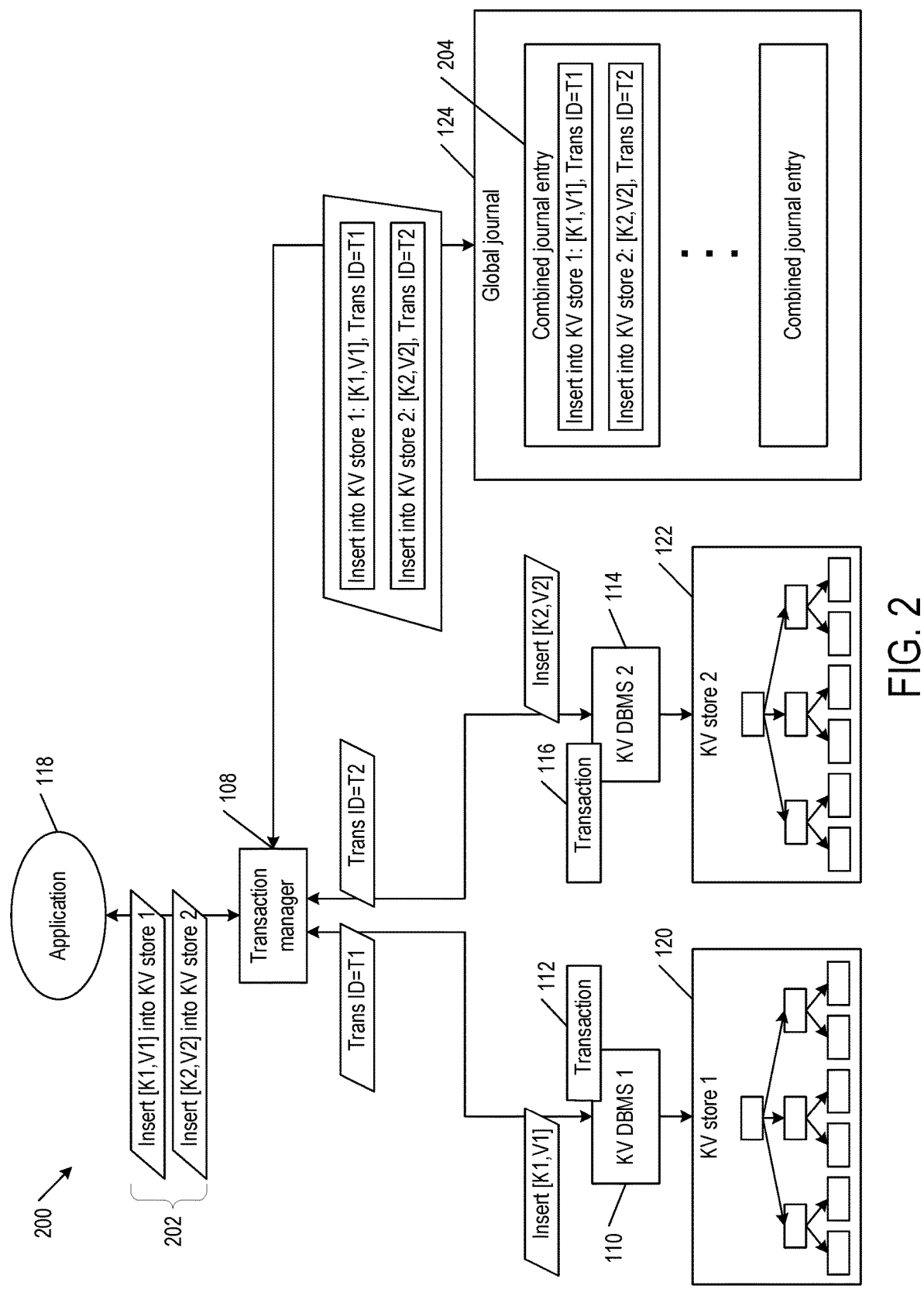
FIG. 2 is a block diagram illustrating interactions between a transaction manager, key-value (KV) database management systems (DBMSs), and a global journal in a first configuration in some examples of the present disclosure.

FIG. 2 is a block diagram illustrating interactions between transaction manager 108, first KV DBMS 110, second KV DBMS 114, and global journal 124 in a configuration 200 in some examples of the present disclosure. In configuration 200, application 118 issues a set 202 of modifications to transaction manager 108. Alternatively, transaction manager 108 may intercept set 202 of modifications. For illustrative purposes, set 202 include modification [K1,V1] to first KV store 120 and modification [K2,V2] to second KV store 122. In handling a set of modifications to multiple KV stores that must all persist or none at all, transaction manager 108 is to join transactions of the KV stores, insert the modifications to the corresponding transactions, create and write a combined journal entry with sub-entries describing the modifications and their corresponding transactions, and detach from the transactions of the KV stores. In the event of a system crash, transaction manager 108 is to replay or commit any sub-entry that has not been committed.

Figure 3:
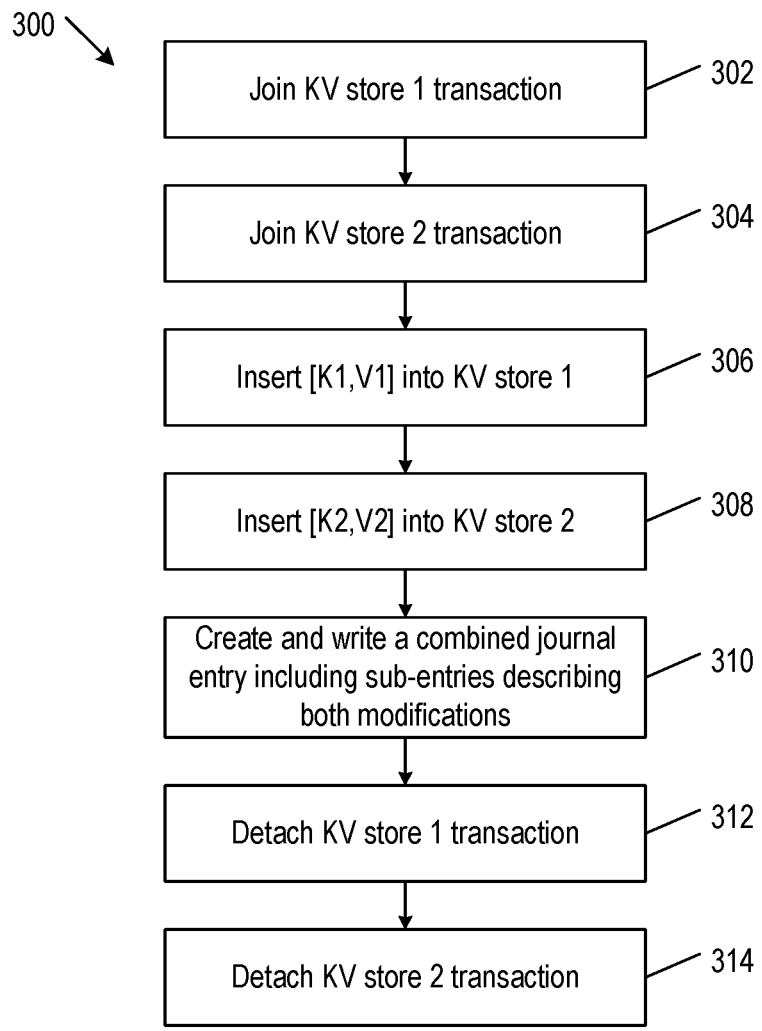
FIG. 3 is a flowchart of a method for the system of FIG. 1, in particular the transaction manager in the first configuration of FIG. 2, to provide consistency across multiple KV stores in some examples of the present disclosure.

FIG. 3 is a flowchart of a method 300 for system 100 (FIG. 1), in particular transaction manager 108 in configuration 200 (FIG. 2) to provide consistency across multiple KV stores in some examples of the present disclosure. Method 300, and other methods described herein, may include one or more operations, functions, or actions illustrated by one or more blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 300 may start in a block 302 after transaction manager 108 receives or intercepts set 202 (FIG. 2) of modification [K1,V1] to first KV store 120 (FIG. 2) and modification [K2,V2] to second KV store 122 (FIG. 2).

In block 302, transaction manager 108 joins transaction 112 of first KV store 120. Transaction manager 108 may join an existing transaction 112 or issue a command to first KV DBMS 110 to create a new transaction 112 if no transaction exists. In response, transaction manager 108 may receive the transaction ID (T1) of transaction 112 from first KV DBMS 110 or actively query first KV DBMS 110 for the transaction ID. Block 302 may be followed by block 304.

In block 304, transaction manager 108 joins transaction 116 of second KV store 122 in a similar manner as described in block 302. Block 304 may be followed by block 306.

In block 306, transaction manager 108 inserts modification [K1,V1] to transaction 112 of first KV store 120 by issuing the appropriate insert command to first KV DBMS 110. In response, first KV DBMS 110 adds the modification to transaction 112. Note that for some KV DBMS, transaction manager 108 may perform blocks 302 and 306 in one step. Block 306 may be followed by block 308.

In block 308, transaction manager 108 inserts modification [K2,V2] to transaction 116 of second KV store 122 in a similar manner as described in block 306. Note that for some KV DBMS, transaction manager 108 may perform blocks 304 and 308 in one step. Block 308 may be followed by block 310.

In block 310, transaction manger 108 creates a combined journal entry 204 describing modification [K1,V1] inserted into transaction T1 of first KV store 120 and modification [K2,V2] inserted into transaction T2 of second KV store 122. Transaction manager 108 then writes combined journal entry 204 to global journal 124 (FIG. 2). Block 310 may be followed by block 312.

In block 312, transaction manager 108 waits for the write of combined journal entry 204 to complete on global journal 124. After the write of combined journal entry 204 completes, transaction manager 108 detaches from transaction 112 of first KV store 120 by issuing the appropriate detach command to first KV DBMS 110. This allows first KV DBMS 110 to commit transaction 112 when it deems appropriate, such as when transaction 112 has accumulated enough modifications. Block 312 may be followed by block 314.

In block 314, transaction manager 108 detaches from transaction 116 of second KV store 122 in a similar manner as described in block 312. Again, this allows second KV DBMS 114 to commit transaction 116 when it deems appropriate, such as when transaction 116 has accumulated enough modifications.

Figure 4:
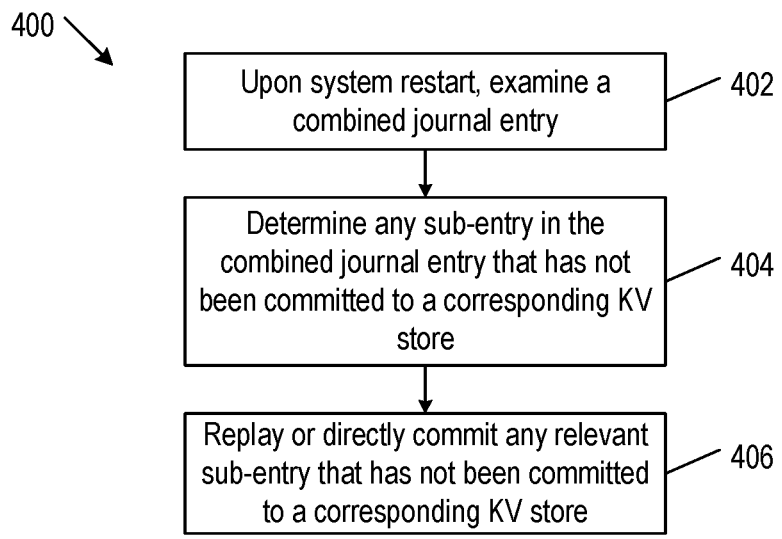
FIG. 4 is a flowchart of a method for the transaction manager of FIG. 1 to recover uncommitted transactions from a system crash or storage failure in examples of the present disclosure.

FIG. 4 is a flowchart of a method 400 for system 100 (FIG. 1), in particular transaction manager 108 in configuration 200 (FIG. 2), to recover uncommitted transactions from a system crash or storage failure in examples of the present disclosure. To demonstrate method 400, assume the first KV DBMS 110 has committed transaction 112 (transaction ID=T1) to first KV store 120 and then system 100 crashes before second KV DBMS 114 can commit transaction 116 (transaction ID=T2) to second KV store 122. Method 400 may begin in block 402.

In block 402, upon detecting system 100 has restarted, transaction manager 108 examines combined journal entry 204 in global journal 124 (FIG. 2). Block 402 may be followed by block 404.

In block 404, transaction manager 108 determines any sub-entry in combined journal entry 204 that has not been committed to a corresponding KV store. Transaction manager 108 determines the IDs of the transactions last committed to first KV store 120 and second KV store 122, respectively, by issuing the appropriate query commands to first KV DBMS 110 and second KV DBMS 114, respectively. Each KV store records the ID of the last committed transaction.

Transaction manager 108 then compares the IDs of the last committed transactions against the IDs of the transactions recorded in the sub-entries of combined journal entry 204. Transaction manager 108 determines the first sub-entry for the modification to first KV store 120 is not relevant as transaction T1 has already been committed (i.e., the returned last committed transaction on first KV store 120 is T1 or higher). Transaction manager determines the second sub-entry for the modifications to second KV store 122 to be relevant as transaction T2 has not been committed (e.g., the returned last committed transaction on second KV store 122 is less than T2). Block 404 may be followed by block 406.

In block 406, transaction manager 108 replays any relevant sub-entry that has not been committed to a corresponding KV store to re-insert the modification in the sub-entry to the corresponding KV store. As the second sub-entry in combined journal entry 204 is relevant, transaction manager 108 re-inserts modification [K2,V2] into second KV store 122 by joining a transaction of second KV store 122, inserting modification [K2,V2] to the transaction, and detach from the transaction. Note that a new combined journal entry is not created as combined journal entry 204 is retained in global journal 124.

In some examples of the present disclosure, transaction manager 108 periodically deletes any combined journal entry with all sub-entries having transaction IDs that have been committed. Transaction manager 108 may query the KV stores for the IDs of the last committed transactions and compare them to the ones in the sub-entries of all the combined journal entries.

Figure 5:
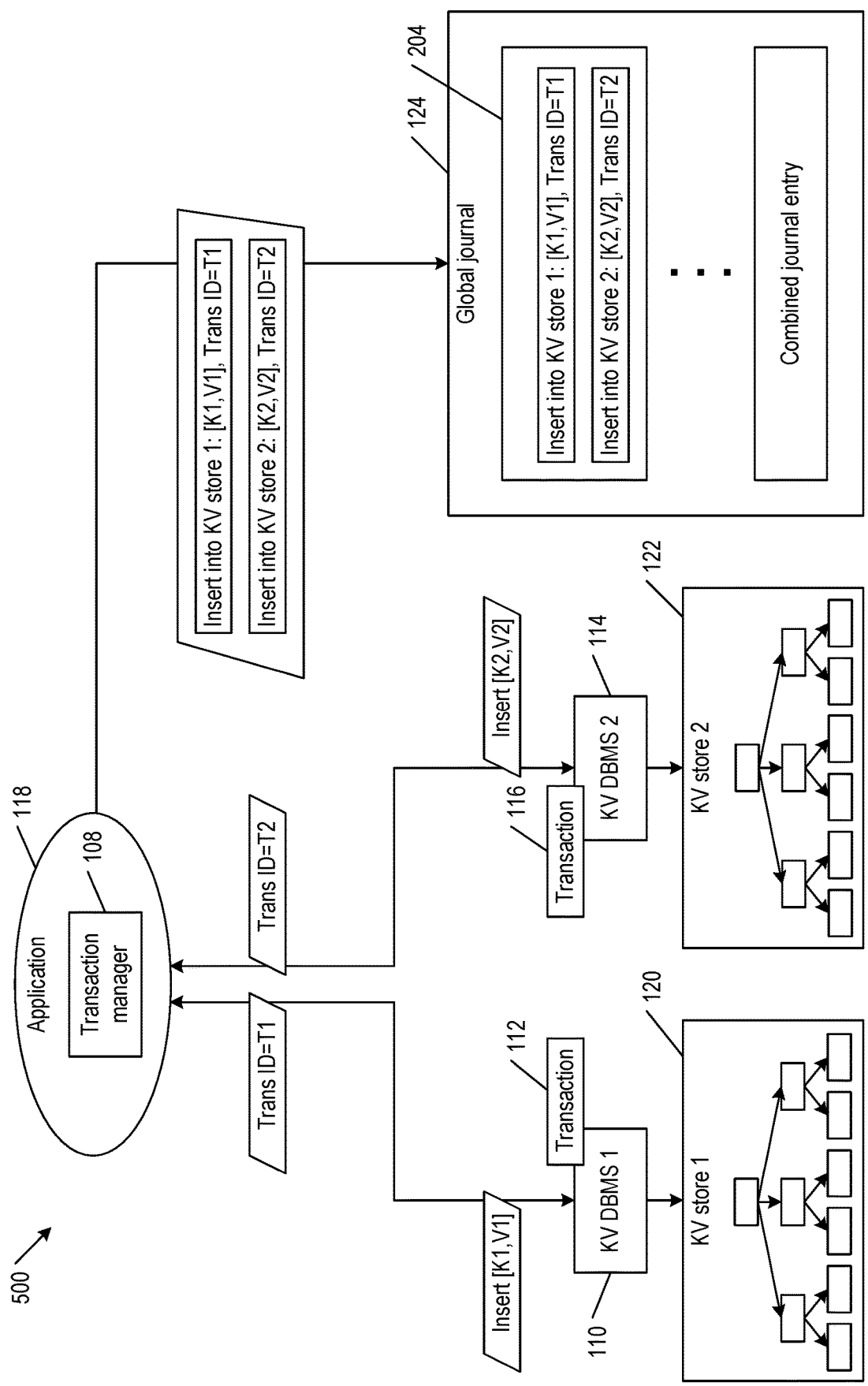
FIG. 5 is a block diagram illustrating interactions between a transaction manager, KV DBMSs for multiple KV stores, and a global journal in some examples of the present disclosure.

FIG. 5 is a block diagram illustrating interactions between transaction manager 108, first KV DBMS 110, second KV DBMS 114, and global journal 124 in a configuration 500 in some examples of the present disclosure. In configuration 500, transaction manager 108 is integrated with application 118. Otherwise configuration 500 operates in a similar manner as configuration 200.

Various other adaptations and combinations of features of the embodiments disclosed are within the scope of the invention. Numerous embodiments are encompassed by the following claims.

The invention claimed is:

1. A method for a transaction manager in a database system to provide consistency across multiple persistent key-value (KV) stores, each having its own non-persistent transactions, for modifications to the persistent KV stores that must all persist or none at all, the method comprising:
　joining a first KV store's transaction;
　joining a second KV store's transaction;
　for a set of modifications including a first modification to the first KV store and a second modification to the second KV store that must all persist or none at all:
　inserting the first modification into the first KV store's transaction;
　inserting the second modification into the second KV store's transaction; and
　creating and writing a combined journal entry comprising first and second sub-entries describing the first and the second modifications in a persistent global journal, respectively;
　after the combined journal entry has completed writing to the global journal, detaching from the first KV store's transaction and detaching from the second KV store's transaction; and
　in response to detecting a storage system restart:
　determining last committed transactions from among transactions of the first and the second KV stores that were recorded as having been committed;
　examining the combined entry in the global journal to determine any sub-entry that has not been committed to a corresponding KV store; and
　replaying any sub-entry that has not been committed to a corresponding KV store.

2. The method of claim 1, further comprising, prior to joining the first and the second KV stores' transactions, receiving the set of modifications from an application.

3. The method of claim 1, further comprising deleting the combined journal entry after determining all the first and the second modifications have been committed.

4. The method of claim 1, wherein determining the last committed transactions comprises the transaction manager issuing query commands to first KV store and the second KV store, the first KV store and the second KV store responding to the query commands by identifying respective transactions that the first and the second KV stores last recorded as having been committed.

5. A database system, comprising:
　processor, main memory, and secondary memory implementing:
　at least two KV stores that are persistent;
　at least one key-value (KV) store database management system (DBMS) managing the at least two KV stores, the at least one KV store DBMS providing each KV store with its own transactions that are not persistent;
　a global journal that is persistent;
　a transaction manager providing consistency across the at least two KV stores for modifications to the at least two KV stores that must all persist or none at all, the transaction manager being configured to:
　join a first KV store's transaction;
　join a second KV store's transaction;
　for a set of modifications including a first modification to the first KV store and a second modification to the second KV store that must all persist or none at all:
　insert the first modification into the first KV store's transaction;
　insert the second modification into the second KV store's transaction; and
　create and write a combined journal entry comprising first and second sub-entries describing the first and the second modifications in the global journal, respectively;
　after the combined journal entry has completed writing to the global journal, detach from the first KV store's transaction and detach from the second KV store's transaction; and
　in response to detecting a storage system restart:
　determine last committed transactions from among transactions of the first and the second KV stores that were recorded as having been committed;
　examine the combined entry in the global journal to determine any sub-entry that has not been committed to a corresponding KV store; and
　replay any sub-entry that has not been committed to a corresponding KV store.

6. The system of claim 5, wherein the transaction manager is distinct from an application issuing the set of modification and the at least one KV store DBMS.

7. The system of claim 5 wherein the transaction manager is part of an application issuing the set of modification.

8. The system of claim 5, wherein the transaction manager is further configured to delete the combined journal entry after determining all the first and the second modifications have been committed.

9. The method of claim 5, wherein determining the last committed transactions comprises the transaction manager issuing query commands to first KV store and the second KV store, the first KV store and the second KV store responding to the query commands by identifying respective transactions that the first and the second KV stores last recorded as having been committed.

10. A non-transitory, computer-readable storage medium encoded with instructions executable by a processor to implement a transaction manager that provides consistency across multiple persistent key-value (KV) stores in a database system, each KV store having its own non-persistent transactions, for modifications to the persistent KV stores that must all persist or none at all, the instructions comprising:
　join a first KV store's transaction;
　join a second KV store's transaction;
　for a set of modifications including a first modification to the first KV store and a second modification to the second KV store that must all persist or none at all:
　insert the first modification into the first KV store's transaction;
　insert the second modification into the second KV store's transaction;
　create and write a combined journal entry comprising first and second sub-entries describing the first and the second modifications in a persistent global journal, respectively;
　after the combined journal entry has completed writing to the global journal, detach from the first KV store's transaction and detach from the second KV store's transaction; and
　in response to detecting a storage system restart:

determine last committed transactions from among transactions of the first and the second KV stores that were recorded as having been committed;

examine the combined entry in the global journal to determine any sub-entry that has not been committed to a corresponding KV store; and replay any sub-entry that has not been committed to a corresponding KV store.

11. The storage medium of claim 10, wherein the instructions further comprise delete the combined journal entry after determining all the first and the second modifications have been committed.

12. The storage medium of claim 10, wherein determining the last committed transactions from among transactions of the first and the second KV stores comprises the transaction manager issuing query commands to first KV store and the second KV store, the first KV store and the second KV store responding to the query commands by identifying transactions that the first and the second KV stores last recorded as having been committed.

* * * * *